United States Patent [19]

Itoi et al.

[11] 4,323,436
[45] Apr. 6, 1982

[54] PURIFICATION OF AQUEOUS SOLUTION OF POTASSIUM CHLORIDE

[75] Inventors: Eiji Itoi, Shikawatashi; Takashi Nakayama, Nishinomiya; Makoto Nakao, Yokohama; Yukio Matsumura, Iakatsuki, all of Japan

[73] Assignee: Asahi Glass Company, Ltd., Tokyo, Japan

[21] Appl. No.: 217,745

[22] Filed: Dec. 18, 1980

[30] Foreign Application Priority Data

Jan. 10, 1980 [JP] Japan ................................. 55-866

[51] Int. Cl.³ .................................................. C25B 1/46
[52] U.S. Cl. ......................................... 204/98; 204/96; 204/128; 423/179; 423/183; 423/184; 423/197; 423/106 R
[58] Field of Search ............... 204/83, 84, 94, 95, 204/98, 128, 96; 423/179, 183, 184, 197, 191, 206 R

[56] References Cited

U.S. PATENT DOCUMENTS

| | | | |
|---|---|---|---|
| 4,078,978 | 3/1978 | Zirngiebl | 204/128 X |
| 4,119,508 | 10/1978 | Yokota et al. | 204/128 |
| 4,189,362 | 2/1980 | Dotson | 204/128 X |
| 4,190,505 | 2/1980 | Ogawa et al. | 204/98 |
| 4,207,152 | 6/1980 | Kadija et al. | 204/98 |
| 4,233,122 | 11/1980 | Lynch et al. | 204/128 X |
| 4,261,803 | 4/1981 | Suhara et al. | 204/98 |
| 4,272,338 | 6/1981 | Lynch et al. | 204/98 |

*Primary Examiner*—Arthur C. Prescott
*Attorney, Agent, or Firm*—Oblon, Fisher, Spivak, McClelland & Maier

[57] ABSTRACT

A purification of an aqueous solution of potassium chloride which is used for producing potassium hydroxide by an electrolysis in an electrolytic cell using a cation exchange membrane is carried out by incorporating an oxidizing reagent to remove additives as an anticaking reagent.

5 Claims, 2 Drawing Figures

4,323,436

PURIFICATION OF AQUEOUS SOLUTION OF POTASSIUM CHLORIDE

BACKGROUND OF THE INVENTION

1. Field of the Invention

The present invention relates to a purification of an aqueous solution of potassium chloride by removing an anticaking reagent and a flotation reagent contained in potassium chloride by incorporating an oxidizing agent in the process for dissolving and purifying potassium chloride to produce potassium hydroxide by an electrolysis in an electrolytic cell using a cation exchange membrane.

2. Description of the Prior Art

Mercury process has been well known to produce potassium hydroxide. It has been also known to produce potassium hydroxide by a cation exchange membrane process which has been recently developed. In the mercury process, there is no trouble for electrolytic characteristics even though an anticaking reagent is dissolved in an aqueous solution of potassium chloride. Therefore, it has not been worked to remove said anticaking reagent in the production of potassium hydroxide by the mercury process.

In usual, the anticaking reagent such as higher alkylamines, for example, octadecylamine is incorporated at a concentration of several hundreds ppm so as to prevent the caking of potassium chloride in an industrial grade potassium chloride. The flotation reagent such as paraffin which is incorporated for a flotation of potash ore is usually remained at a concentration of several hundreds ppm. The compositions and properties of the anticaking reagent and the flotation reagent are not clearly disclosed. It has been known that the anticaking reagent is usually insoluble in the acidic condition of the aqueous solution of potassium chloride to be a suspension in the aqueous solution of potassium chloride, however, the anticaking reagent is usually dissolved in the alkaline condition of the aqueous solution of potassium chloride. Therefore, the anticaking reagent can be removed by filtering the aqueous solution of potassium chloride in the acidic condition. This process has not been practically employed because it has not been economical in view of substrates of filtering equipments and filtration property. On the other hand, any behavior of the flotation reagent in the electrolysis has not been known.

SUMMARY OF THE INVENTION

It is an object of the present invention to provide a purification of an aqueous solution of potassium chloride so as to remove an anticaking reagent.

The foregoing and other objects of the present invention have been attained by providing a purification of an aqueous solution of potassium chloride which is used for producing potassium hydroxide by an electrolysis in an electrolytic cell using a cation exchange membrane which comprises incorporating an oxidizing reagent in the aqueous solution of potassium chloride in an acidic condition, to remove the anticaking reagent.

DETAILED DESCRIPTION OF THE PREFERRED EMBODIMENTS

Figure 1:
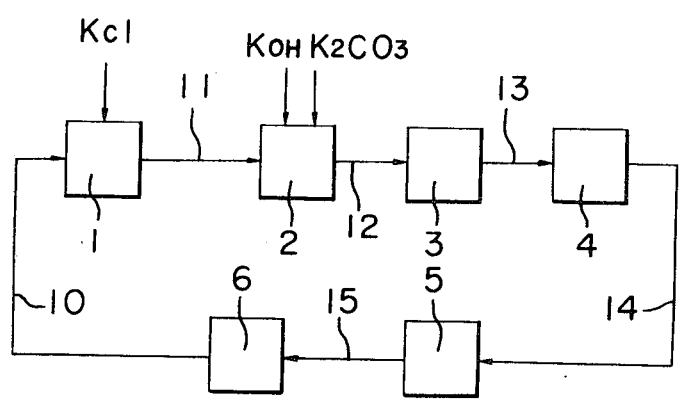
FIG. 1 is a block diagram of flow-chart for a purification of an aqueous solution of potassium chloride used for the conventional mercury process.

A production of potassium hydroxide by a cation exchange membrane process has not yet carried out industrially. Inventors of this invention found first a trouble that in a duration of electrolysis, there occured a deposition of something onto a surface of said membrane and characteristics of said membrane deteriorated. According to the inventors' investigation, the following was found out in a production of potassium hydroxide by the cation exchange membrane process, if an aqueous solution of potassium chloride containing additives such as the anticaking reagent is fed into an anode compartment of an electrolytic cell using a cation exchange membrane to attain the electrolysis, the anticaking reagent and the flotation reagent dissolved in the aqueous solution of potassium chloride are chlorinated by chlorine gas generated from the anode, to form oily or grease impurities which adhered onto the surface of the cation exchange membrane in the anode side to cause increase of a cell voltage and decrease of a current efficiency.

As a result of various studies for removing additives such as the anticaking reagent and the flotation reagent from the aqueous solution of potassium chloride, it has been found that when an oxidizing reagent is incorporated in the aqueous solution of potassium chloride containing additives such as the anticaking reagent and the flotation reagent in an acidic condition preferably in a condition of pH of lower that 4 to oxidize the additives such as the anticaking reagent and the flotation reagent, the oxidized additives especially the oxidized anticaking reagent are not dissolved but suspended in a form of a suspension in the aqueous solution of potassium chloride even though pH of the aqueous solution of potassium chloride is converted to an alkaline condition.

The oxidizing agent is preferably selected from potassium hypochlorite, sodium hypochlorite or chlorine. The concentration of the oxidizing agent is preferably higher in view of the increase of effect for oxidizing the anticaking reagent, however it is preferably lower in view of the prevention of decrease of speed for the impurity precipitation and separation in the aqueous solution of potassium chloride. The concentration of the oxidizing reagent is usually in a range of 5 to 20 ppm preferably 5 to 15 ppm, especially 5 to 10 ppm.

The suspended oxidized additives are coprecipitated with other impurities such as calcium carbonate and/or magnesium hydroxide in the aqueous solution of potassium chloride. The additives such as the anticaking reagent and the flotation reagent can be substantially separated from the aqueous solution of potassium chloride by filtering supernatant separated by the precipitation by a precoat filter.

Referring to the drawings, the process of the present invention will be further illustrated.

FIG. 1 shows a block diagram for a purification of an aqueous solution of potassium chloride which has been used for the conventional mercury process.

The reference (1) designates a tank for saturation in which potassium chloride is dissolved into a dilute solution of potassium chloride (10) which is dechlorinated in a dechlorination tower (6) to prepare a substantially saturated solution of potassium chloride. The reference (2) designates a tank for addition in which potassium hydroxide or potassium carbonate is added to the saturated solution of potassium chloride (11) to convert a magnesium component and a calcium component in the saturated solution of potassium chloride into insoluble magnesium hydroxide and calcium carbonate to prepare a saturated solution of potassium chloride containing the impurities (12). The reference (3) designates a tank for clarification in which magnesium hydroxide and calcium carbonate are precipitated and separated and discharged from the bottom of the tank for clarification (3). The saturated solution of potassium chloride as the supernatant is overflowed through the upper part of the tank for clarification (4) as a crude solution of potassium chloride (13). The reference (4) designates a filter in which magnesium hydroxide and calcium carbonate remained in the crude solution (13) are separated to prepare a purified solution of potassium chloride (14) which is fed into an electrolytic cell (5). The purified solution fed into the electrolytic cell (5) is converted into a dilute solution having low concentration of potassium chloride and containing dissolved chlorine (15) by an electrolysis. The diluted solution is dechlorinated by the dechlorination tower (6) and is fed into the tank for saturation (1) to prepare the saturated solution of potassium chloride.

Figure 2:
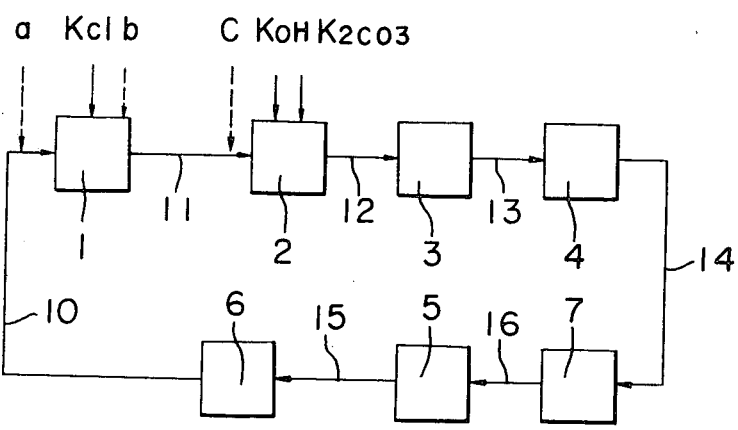
FIG. 2 is a block diagram of flow-chart for a purification of an aqueous solution of potassium chloride used for a cation exchange membrane process according to the present invention.

FIG. 2 shows a block diagram for a purification of an aqueous solution of potassium chloride which is used for an electrolysis process using a cation exchange membrane.

The reference (1) designates a tank for saturation in which potassium chloride is dissolved into a dilute solution of potassium chloride (10) which is dechlorinated in a dechlorination tower (6) to prepare a substantially saturated solution of potassium chloride. Hydrochloric acid is added to the dilute solution of potassium chloride (10) which contains chlorine in the upstream of the dechlorination tower (6) so as to give pH of lower than 4 for the saturated solution of potassium chloride (11). In the saturated solution of potassium chloride, the anticaking reagent and the flotation reagent (derived from the potash ore) are suspended. In order to oxidize these impurities so as to prevent dissolution of the addition in an alkaline condition of the saturated solution of potassium chloride, the oxidizing reagent is added at the position a, b or c whereby the anticaking reagent and the flotation reagent are converted to be water insoluble materials. The optimum position for the addition of the oxidizing reagent is the position b though the position for the addition can be the position a or c. Potassium hydroxide or potassium carbonate is added to the solution of potassium chloride containing the water insoluble oxidized impurities such as the anticaking reagent and the flotation reagent in the tank for addition (1) so as to remove magnesium and calcium ions by precipitating insoluble precipitate of magnesium hydroxide and calcium carbonate. In the tank for clarification (3), the insoluble impurities such as the anticaking reagent and the flotation reagent are coprecipitated with the insoluble precipitate. On the other hand, the solution of potassium chloride overflowed from the tank for clarification (13) is contaminated by small amounts of the insoluble impurities such as the anticaking reagent and the flotation reagent with a small amount of the precipitate. Therefore, the solution is filtered by a super filter (4) such as a precoat filter to obtain the solution of potassium chloride (14) from which the anticaking reagent and the flotation reagent are removed so as not to affect to the electrolysis. The solution of potassium chloride is further treated by a purification device (7) to obtain a purified solution of potassium chloride (16) from which magnesium and calcium ions dissolved in the solution of potassium chloride so as not to affect to the electrolysis. The purified solution of potassium chloride (16) is fed into the electrolytic cell (5) in which chlorine gas, potassium hydroxide, hydrogen gas and the dilute solution of potassium chloride (15) are obtained. The dilute solution of potassium chloride (15) is dechlorinated in the dechlorination tower (6) to obtain the dechlorinated dilute solution (10) and this is recycled.

The present invention will be further illustrated by certain examples and references which are provided for purposes of illustration only and are not intended to be limiting the present invention.

EXAMPLE

The system for purification of an aqueous solution of potassium chloride shown in FIG. 2 was used and sodium hypochlorite, potassium hypochlorite and chlorine were used as the oxidizing reagent at various concentrations in the purification of the aqueous solution of potassium chloride. Each purified solution of potassium chloride was fed into the electrolytic cell having a size of a width of 300 mm and a height of 1000 mm using a cation exchange membrane, to carry out each electrolysis. In the operation of the electrolytic cell, the electrolysis was carried out at 90° C. in a current density of 20 A/dm$^2$ to give a conversion of potassium chloride to about 50% and a concentration of potassium hydroxide of about 35%. The aqueous solution of potassium chloride contained 100 ppm of octadecylamine as the anticaking reagent and 50 ppm of palmitic acid as the flotation reagent.

The results are shown in Table 1.

TABLE 1

| Test No. | 1 | 2 | 3*[1] | 4 |
|---|---|---|---|---|
| pH | 6–7 | 6–7 | 6–7 | 3–4 |
| Oxidizing agent | | | | |
| Composition | NaClO | NaClO | NaClO | NaClO |
| Position for adding (position) | b | b | b | b |
| Concentration (ppm) | 5 | 15 | 30 | 20 |
| Concentration of anticaking agent in KCl solution (ppm) | <0.1*[2] | <0.1 | <0.1 | <0.1 |
| Concentration of flotation reagent in KCl solution (ppm) | <0.5*[3] | <0.5 | <0.5 | <0.5 |
| Characteristics of electrolysis | | | | |
| Initial cell voltage (Volt) | 3.54 | 3.52 | 3.55 | 3.53 |
| Initial current efficiency (%) | 94 | 94 | 94 | 94 |
| Cell voltage after 30 days (Volt) | 3.59 | 3.52 | 3.54 | 3.54 |
| Current efficiency after 30 days (%) | 93.5 | 94 | 94 | 94 |

Note:
*[1] The sedimentation in the tank for clarification was not smooth whereby the switch for the filter was shortened.
*[2] The measurement limit is 0.1 ppm.
*[3] The measurement limit is 0.5 ppm.

| Test No. | 5 | 6 | 7 | 8 |
|---|---|---|---|---|
| pH | 3–4 | 3–4 | 3–4 | 3–4 |
| Oxidizing agent | | | | |
| Composition | KClO | Cl$_2$ | NaClO | NaClO |
| Position for adding (position) | b | b | a | c |
| Concentration (ppm) | 10 | 5 | 10 | 10 |
| Concentration of anticaking agent in KCl solution (ppm) | <0.1 | <0.1 | <0.1 | <0.1 |
| Concentration of flotation reagent in KCl solution (ppm) | <0.5 | <0.5 | <0.5 | <0.5 |
| Characteristics of | | | | |

TABLE 1-continued

| electrolysis | | | | |
|---|---|---|---|---|
| Initial cell voltage (Volt) | 3.54 | 3.53 | 3.53 | 3.54 |
| Initial current efficiency (%) | 94 | 94 | 94 | 94 |
| Cell voltage after 30 days (Volt) | 3.54 | 3.56 | 3.53 | 3.54 |
| Current efficiency after 30 days (%) | 94 | 94 | 94 | 94 |

REFERENCES

In accordance with the process of Examples 1 to 8 except that any oxidizing reagent was not used, each purification of the aqueous solution of potassium chloride was carried out, each purified solution was fed into the electrolytic cell having a size of a width of 300 mm and a height of 1000 mm using a cation exchange membrane to carry out each electrolysis. In the operation of the electrolytic cell, the electrolysis was carried out at 90° C. in a current density of 20 A/dm$^2$ to give a conversion of potassium chloride to about 50% and a concentration of potassium hydroxide of about 35%. The results are shown in Table 2.

TABLE 2

| Test No. | 1 | 2 |
|---|---|---|
| pH | 2-3 | 3-4 |
| Concentration of anticaking agent in KCl solution (ppm) | 0.5 | 0.4 |
| Concentration of flotation reagent in KCl solution (ppm) | 50 | 50 |
| Characteristics of electrolysis: | | |
| Initial cell voltage (Volt) | 3.53 | 3.54 |
| Initial current efficiency (%) | 94 | 94 |
| Cell voltage after 30 days | 3.77 | 3.73 |
| Current efficiency after 30 days (%) | 92.5 | 93 |

We claim:

1. In a purification of an aqueous solution of potassium chloride which is used for producing potassium hydroxide by an electrolysis in an electrolytic cell using a cation exchange membrane, an improvement characterized by incorporating an oxidizing reagent to remove additives as an anticaking reagent.

2. The purification according to claim 1 wherein said oxidizing reagent is potassium hypochlorite, sodium hypochlorite or chlorine.

3. The purification according to claim 1 or 2 wherein said oxidizing reagent is fed into a tank for saturation to prepare a saturated solution of potassium chloride or into upstream thereof or into upstream of a tank for clarification.

4. The purification according to claim 2 or 3 a concentration of said oxidizing reagent in said aqueous solution of potassium chloride is in a range of 5 to 20 ppm as hypochlorite ion.

5. The purification according to claim 1, 2, 3 or 4 wherein an oxidized anticaking reagent in said aqueous solution containing said oxidized anticaking reagent oxidized by said oxidizing reagent is coprecipitated with other impurities in a tank for clarification and said aqueous solution of potassium chloride overflowed from said tank for clarification.

* * * * *